(12) United States Patent
Schum et al.

(10) Patent No.: US 12,150,603 B2
(45) Date of Patent: Nov. 26, 2024

(54) SYSTEM AND METHOD FOR AN OUTDOOR BATHROOM SYSTEM

(71) Applicant: PACT Outdoors LLC, Crested Butte, CO (US)

(72) Inventors: Noah Schum, Crested Butte, CO (US); Christopher Thomas, Lakewood, CO (US); Michael J. Nickel, Golden, CO (US); Kimberly Inman, Denver, CO (US)

(73) Assignee: PACT Outdoors LLC, Crested Butte, CO (US)

( * ) Notice: Subject to any disclaimer, the term of this patent is extended or adjusted under 35 U.S.C. 154(b) by 139 days.

(21) Appl. No.: 17/858,884

(22) Filed: Jul. 6, 2022

(65) Prior Publication Data

US 2024/0008694 A1   Jan. 11, 2024

(51) Int. Cl.
*A47K 11/02* (2006.01)
*A01B 1/02* (2006.01)
*A47K 10/16* (2006.01)

(52) U.S. Cl.
CPC ............... *A47K 11/02* (2013.01); *A01B 1/02* (2013.01); *A47K 10/16* (2013.01)

(58) Field of Classification Search
CPC ...... A47K 11/02; A47K 11/03; A47K 11/035; A47K 11/06; A47K 17/00; A01B 1/022; A45F 2200/0575; E01H 2001/128
See application file for complete search history.

(56) References Cited

U.S. PATENT DOCUMENTS

| | | | | |
|---|---|---|---|---|
| 4,312,085 A | * | 1/1982 | Potter | A47K 11/02 4/476 |
| 5,547,240 A | * | 8/1996 | Hartshorn | E01H 1/1206 294/49 |
| 7,950,085 B2 | * | 5/2011 | McGovern | A01B 1/022 294/57 |
| 2009/0045641 A1 | * | 2/2009 | Macartney Snape | A01B 1/022 206/349 |

FOREIGN PATENT DOCUMENTS

KR   102094790 B1 * 4/2020

OTHER PUBLICATIONS

Mycoremediation. https://web.archive.org/web/20190908125057/ https://permies.com/t/25910/Mycoremediation-fixing-contamination-mushrooms (Year: 2019).*
Best Garden Trowel. https://www.nurseryenterprises.com/shop/tools-garden-supplies/best-garden-trowel-tool-ever-plus-nylon-sheath-lesche/. (Year: 2020).*
Mycoremediation: Expunging environmental pollutants. https://www.sciencedirect.com/science/article/pii/S2215017X19307003. (Year: 2020).*

* cited by examiner

*Primary Examiner* — Erin Deery
(74) *Attorney, Agent, or Firm* — Holland & Hart LLP

(57) ABSTRACT

An outdoor bathroom system for disposing of human waste. The outdoor bathroom system includes a shovel for digging a hole, at least one tablet for breaking down the human waste, and at least one wipe. The human waste, the at least one wipe, and the at least one tablet are disposed of in the hole and the at least one tablet breaks down the human waste and the at least one wipe.

17 Claims, 7 Drawing Sheets

SYSTEM AND METHOD FOR AN OUTDOOR BATHROOM SYSTEM

TECHNICAL FIELD

The present disclosure relates generally to bathroom systems, and more particularly relates to systems and methods for outdoor bathroom systems.

BACKGROUND

Proper disposal of human waste is important to avoid pollution of water sources, minimize the possibility of spreading disease, and maximize the rate of decomposition. Specifically, humans eat processed foods containing unnatural substances and, as such, the processed food may leave traces of unnatural substances in nature, in the soil, and/or ultimately in animals that consume the substances. Additionally, human waste may be transported into the water system by rain or snow, contaminating the water system. Moreover, toilet paper used during waste disposal may litter the landscape. During outdoor activities such as hiking or biking, a bathroom may not be available, and the hiker or biker may need to use the bathroom. People are encouraged to bury their waste when disposing of their waste outdoors. However, simply burying waste does not properly dispose of all unnatural substances.

There is a need for an outdoor bathroom system that quickly and efficiently decomposes human waste.

SUMMARY

An outdoor bathroom system for disposing of human waste. The outdoor bathroom system includes a shovel for digging a hole, at least one tablet for breaking down the human waste, and at least one wipe. The human waste, the at least one wipe, and the at least one tablet are disposed of in the hole and the at least one tablet breaks down the human waste and the at least one wipe.

An outdoor bathroom system for disposing of human waste. The outdoor bathroom system includes a shovel for digging a hole, at least one tablet for breaking down the human waste, and at least one wipe. The shovel defines a shovel cavity. The human waste, the at least one wipe, and the at least one tablet are disposed of in the hole and the at least one tablet breaks down the human waste and the at least one wipe. The at least one wipe and the at least one tablet are at least partially contained within the shovel cavity.

A method of disposing of human waste using an outdoor bathroom system. The outdoor bathroom system includes at least one tablet configured to decompose the human waste, a shovel, and at least one wipe. The method includes digging a hole using the shovel. The method also includes depositing human waste in the hole. The method further includes expanding the at least one wipe by adding water to the at least one wipe. The method also includes cleaning with the at least one wipe. The method further includes placing the at least one wipe in the hole. The method also includes placing the at least one tablet in the hole. The method further includes filling the hole using the shovel. The method also includes decomposing the human waste using the at least one tablet.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label.

Figure 1:
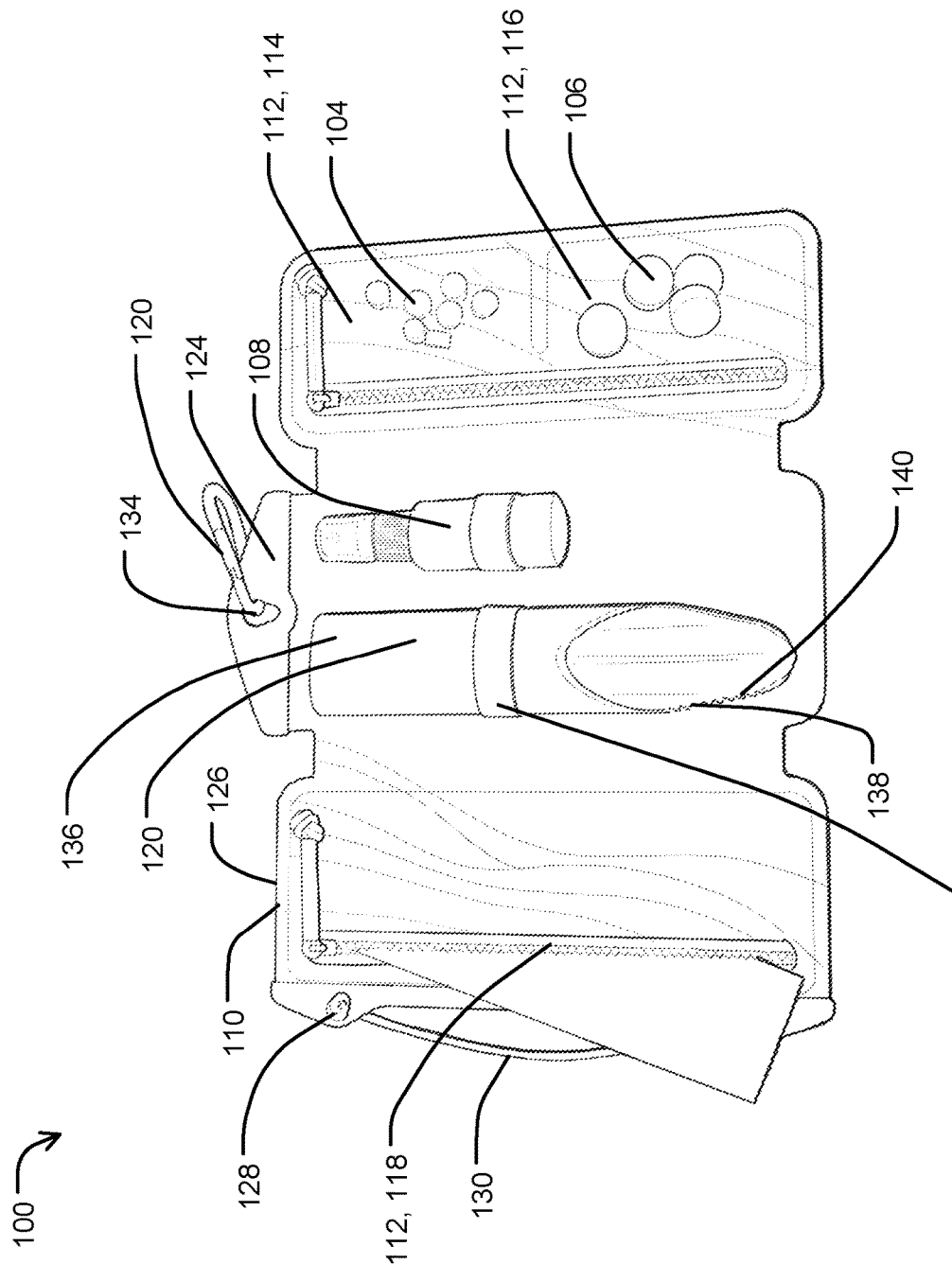
FIG. 1 illustrates an example outdoor bathroom system for disposing of human waste in an ecologically friendly manner in an unfolded configuration in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure include an outdoor bathroom system for disposing of human waste in an ecologically friendly manner. Proper disposal of human waste is important to avoid pollution of water sources, minimize the possibility of spreading disease, and maximize the rate of decomposition. Specifically, humans eat processed foods containing unnatural substances and, as such, the processed food may leave traces of unnatural substances in nature, in the soil, and/or ultimately in animals that consume the substances. Additionally, human waste may be transported into the water system by rain or snow, contaminating the water system. Furthermore, human waste may attract animals to campsites and areas where humans are prevalent. Moreover, human waste is a nuisance and unhealth when not properly disposed of and toilet paper used during waste disposal may litter the landscape. Accordingly, people are encouraged to bury their waste when disposing of their waste outdoors. However, simply burying waste does not properly dispose of all unnatural substances.

The outdoor bathroom systems described herein include a tablet that is configured to break down human waste and ensures that the waste is broken down in an ecologically friendly manner. More specifically, the outdoor systems described herein include a shovel, a table, and wipes. The shovel is used to dig a hole for containing the human waste. The tablet is configured to break down human waste and the wipe is biodegradable. More specifically, the tablet includes mycelium that is configured to break down human waste up to ten times faster than nature and the wipe includes a biodegradable material that is configured to accelerate the growth of the mycelium. During operation, the user digs a hole using the shovel and deposits their waste in the hole. The user then cleans themselves with the wipe and places the wipe in the hole with the waste. Finally, the user places a tablet in the hole with the waste and the wipe. The mycelium in the tablet breaks down the waste and the wipe and accelerates the breakdown of the waste by up to ten times faster than nature. Accordingly, the outdoor bathroom system described herein enables the user to dispose of their waste in an ecologically friendly manner, reducing damage to the environment, plants, and/or wildlife.

Figure 2:
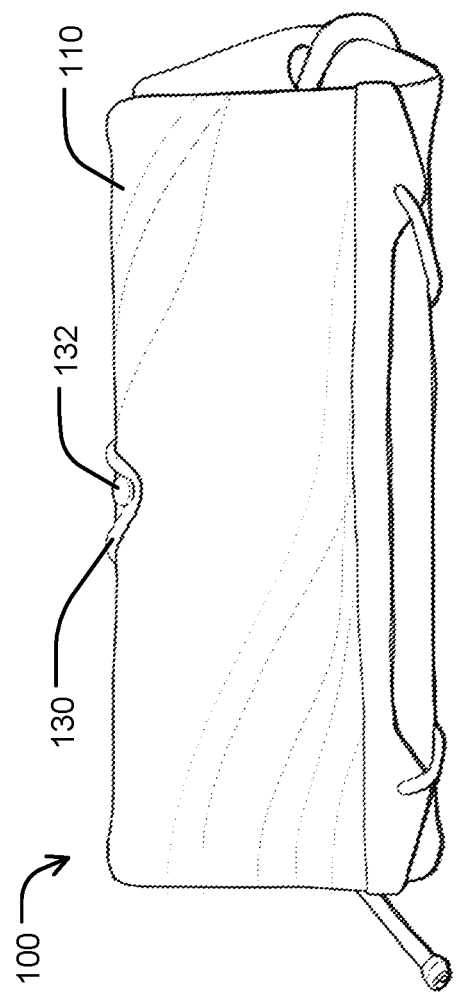
FIG. 2 illustrates a perspective view of the outdoor bathroom system shown in FIG. 1 in a folded configuration in accordance with aspects of the present disclosure.

FIG. 1 illustrates a perspective view of an outdoor bathroom system 100 for disposing of human waste in an ecologically friendly manner in an unfolded configuration. FIG. 2 illustrates a perspective view of the outdoor bathroom system 100 in a folded configuration. The outdoor bathroom system 100 includes a shovel 102, at least one tablet 104 configured to break down human waste, and at least one wipe 106 for cleanup. The outdoor bathroom system 100 may optionally further include hand sanitizer 108 and a case 110. The outdoor bathroom system 100 may optionally further include any other toiletry that enables the outdoor bathroom system 100 to operate as described herein. For example, the outdoor bathroom system 100 may further include lotions, deodorants, sunscreen, facial cleansers, tooth brushes, tooth paste, floss, razors, razor blades, shaving cream, shampoo, conditioner, makeup, hair products, and/or any other toiletry.

In the illustrated embodiment, the case 110 may also include at least one storage pocket 112 for general storage or for storing waste. In the illustrated embodiment, the case 110 includes three storage pockets 112. In alternative embodiments, the case 110 may include any number of storage pockets 112 that enable the case 110 to operate as described herein. More specifically, in the illustrated embodiment, the case 110 includes a first storage pocket 114, a second storage pocket 116, and a third storage pocket 118. The first storage pocket 114 is configured to contain the tablets 104, the second storage pocket 116 is configured to contain the wipes 106, and the third storage pocket 118 is configured for general storage or for storing waste. In the illustrated embodiment, the third storage pocket 118 includes instructions and general information. In alternative embodiments, the storage pockets 112 may be configured to contain any toiletry that enables the outdoor bathroom system 100 to operate as described herein.

In the illustrated embodiment, the case 110 includes a trifold case having a carabiner 120 that enables the case 110 to be attached to a backpack (not shown). More specifically, in the illustrated embodiment, the case 110 includes a first side 122, a second side 124, and a third side 126 that are configured to fold onto each other in a trifold configuration that contains the outdoor bathroom system 100 in a compact containment system. The third side 126 defines holes 128 and a string 130 is strung through the holes 128. Additionally, the second side 124 include a hook 132 that enables the case 110 to be folded. In the folded configuration, the string 130 is wrapped around the first side 122, the second side 124, and the third side 126 and hooked on the hook 132 such that the case 110 remains closed. To open the case 110, the user unhooks the string 130 from the hook 132, unwraps the string 130 from around the case 110, and unfolds the first side 122, the second side 124, and the third side 126. Additionally, the second side 124 also include a hole 134 and the carabiner 120 is attached to the hole 134. The carabiner 120 may be further attached to a backpack (not shown), clothing (not shown), and/or other outdoor equipment to enable easy carrying of the outdoor bathroom system 100.

In the illustrated embodiment, the shovel 102 includes an ergonomic shape that enables the user to comfortably dig a hole for waste disposal. In other embodiments, the shovel 102 may have any shape that enables the outdoor bathroom system 100 to operate as described herein. Specifically, the shovel 102 includes a tube 136 with an angled end 138 that is sized and shaped to form a head 140 of the shovel 102. The tube 136 forms an ergonomic shape for the user's hand and the angled end 138 enables the head 140 to cut into the soil to dig the hole. In the illustrated embodiment, the shovel 102 is made of aluminum. In alternative embodiments, the shovel 102 may be made of any material that enables the outdoor bathroom system 100 to operate as described herein. Additionally, the case 110 includes an elastic loop 142 and the shovel 102 is contained in the case 110 by sliding the shovel 102 in the elastic loop 142.

In the illustrated embodiment, the tablet 104 may include mycelium tablets configured to break down human waste. More specifically, the tablet 104 includes wooden plugs inoculated with at least one species of mycelium. During decomposition, mycelium kills harmful pathogens, and converts waste into nutrients that other organisms feed on. Additionally, at least some species of mycelium decomposes waste up to ten times faster than nature. Specifically, mycelium includes a root-like structure of a fungus consisting of a mass of branching, thread-like hyphae. The fungus absorbs nutrients from its environment in a two-stage process. First, the hyphae secrete enzymes onto or into the waste, which break down biological polymers into smaller units such as monomers. These monomers are then absorbed into the mycelium by facilitated diffusion and active transport. In the illustrated embodiment, the tablet 104 includes *Stropharia rugosoannulata*. *Stropharia rugosoannulata* is a species of fungus that is an effective biomass capable of breaking down both fecal matter and paper products through vigorous growth in a wide range of bioregions and seasonal fluctuations. *Stropharia rugosoannulata* is also effective in reducing coliforms commonly found in human feces. Other species with these characteristics and that may be included in the tablets 104 include *Coprinus comatus, Clitocybe nuda, Lentinus tigrinus*, and/or *Neolentinus lepideus*. In alternative embodiments, the mycelium may include any species of fungus that enables the outdoor bathroom system 100 to operate as described herein including *Stropharia rugosoannulata, Coprinus comatus, Clitocybe nuda, Lentinus tigrinus*, and/or *Neolentinus lepideus*.

In alternative embodiments, the tablet 104 may include any device configured to break down waste. For example, in an alternative embodiment, the tablet 104 may include bacteria inoculated in the wooden plug rather than mycelium. The bacteria may be configured to decompose waste in a similar manner to the mycelium. That is, the bacteria may be configured to decompose and absorb waste. Additionally, in other alternative embodiments, the tablet 104 may include any other biodegradable material configured to decompose and/or absorb waste.

In the illustrated embodiment, the wipes 106 include compressed wipes that are configured to expand when water is added to the wipes. Additionally, the wipes 106 include or are made from a biodegradable material. Moreover, the wipes 106 include a material that is configured to accelerate the growth of the mycelium in the tablets 104. Furthermore, the wipes 106 are dehydrated and compressed into a tablet or pellet that is compact and light weight. Specifically, in the illustrated embodiment, the wipes 106 are formed of cotton, are completely biodegradable, and accelerate the growth of the mycelium in the tablets 104. The user adds water to the wipes 106 to expand the wipes 106 into a useable toilet paper and places the wipe into the hole after cleaning themselves.

Optionally, the outdoor bathroom system 100 may optionally further include hand sanitizer 108. The hand sanitizer 108 may include any type of hand sanitizer that enables the outdoor bathroom system 100 to operate as described herein. In the illustrated embodiment, the hand sanitizer 108 includes a hand sanitizer configured to disinfect germs. Specifically, in the illustrated embodiment, the hand sanitizer 108 includes an alcohol-based hand sanitizer that contains at least 60 percent alcohol.

During operations, the user digs a hole with the shovel 102 and prepares and expands the wipe 106. Typically, the hole is about 6 inches deep. However, because the tablets break down the human waste, the hole may be shallower than normal because the mycelium breaks down the human waste faster than natural processes. Furthermore, the tablets enable a user to dispose of waste in a variety of environments with a variety of soils/surface conditions because the mycelium breaks down the human waste faster than natural processes. For example, if the user is hiking in a mountainous/rocky area, the user may cover their waste with rocks. The tablets enable a user to cover their waste with rocks and/or other surface material because the mycelium breaks down the human waste faster than natural processes.

The user then deposits their waste in the hole and cleans up with the wipes 106. The user then places the wipe 106 in the hole with their waste, and places at least one of tablets 104 in the hole with their waste and the wipe 106. In the illustrated embodiment, the user places three tablets 104 in the hole with their waste and the wipe 106. In alternative embodiments, the user may place any number of tablets 104 in the hole. The user then uses the shovel 102 to bury their waste. The tablets 104 are configured to break down human waste and the wipes 106 in an environmentally friendly manner.

Figure 3:
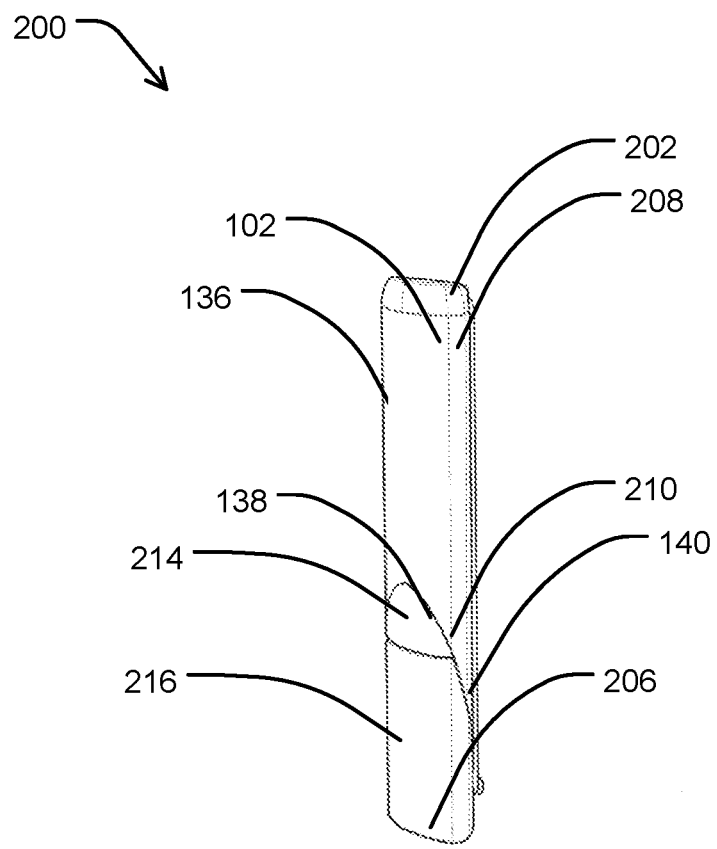
FIG. 3 illustrates a perspective front view of an example of an alternative outdoor bathroom system in an assembled configuration in accordance with aspects of the present disclosure.
Figure 4:
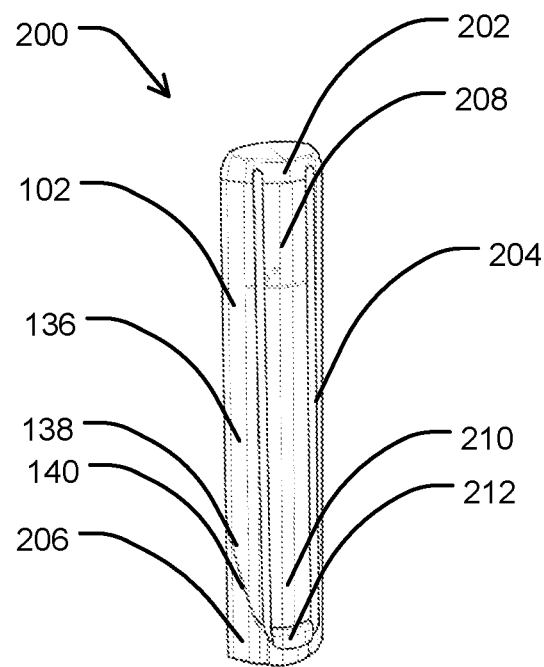
FIG. 4 illustrates a perspective back view of the outdoor bathroom system shown in FIG. 3 in an assembled configuration in accordance with aspects of the present disclosure.
Figure 5:
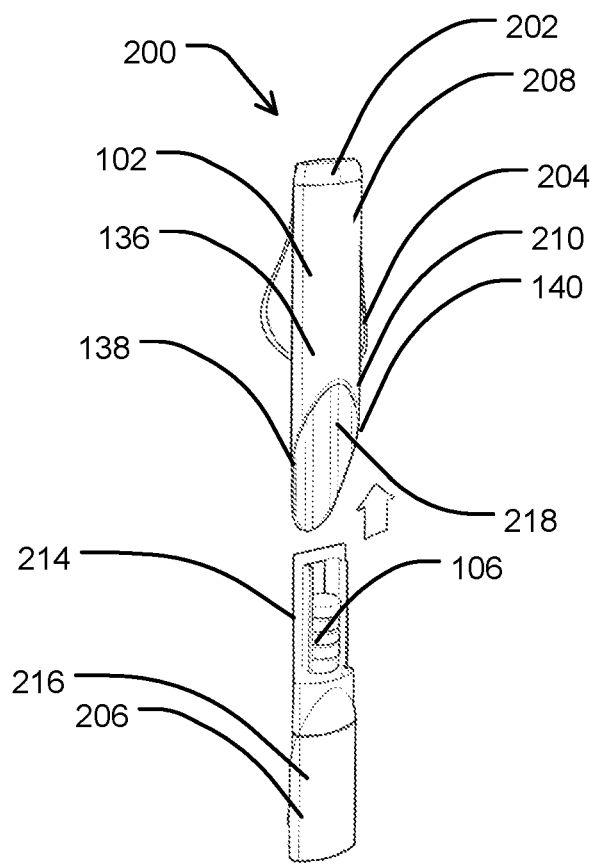
FIG. 5 illustrates a perspective front view of the outdoor bathroom system shown in FIG. 3 in a partially disassembled configuration in accordance with aspects of the present disclosure.
Figure 6:
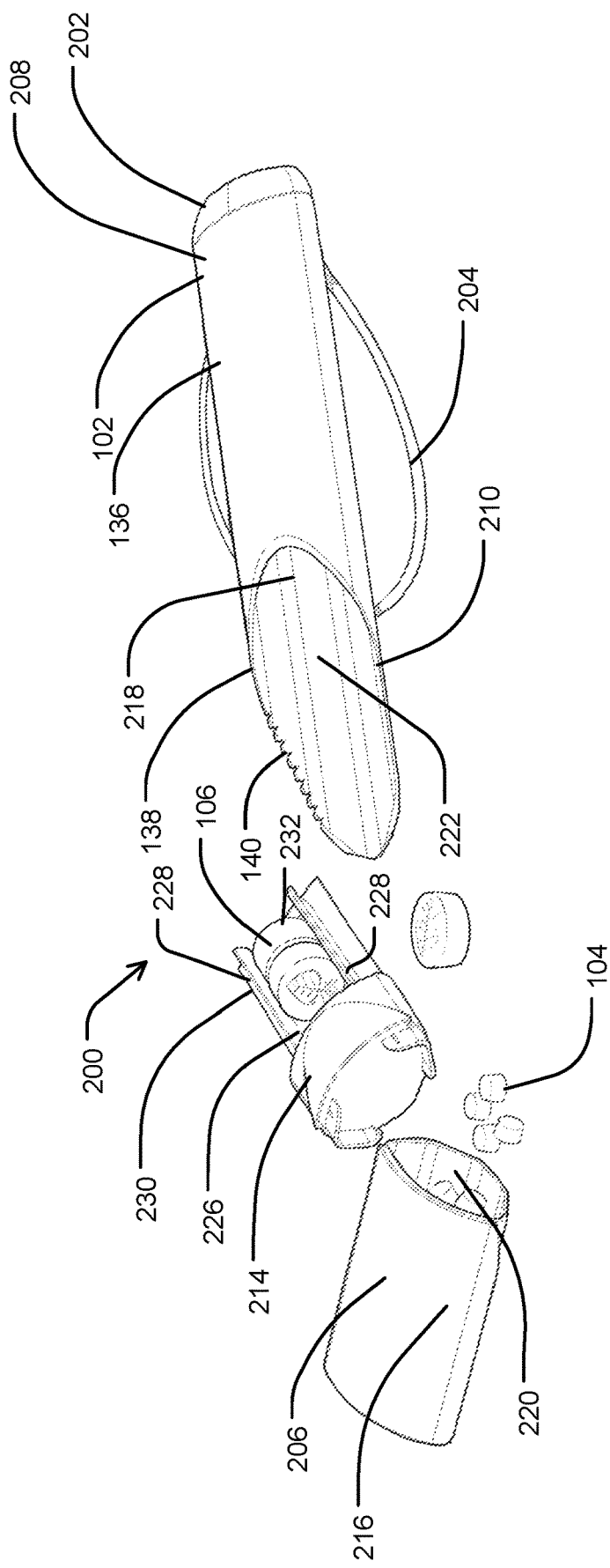
FIG. 6 illustrates a perspective front view of the outdoor bathroom system shown in FIG. 3 in a disassembled configuration in accordance with aspects of the present disclosure.

FIG. 3 illustrates a perspective front view of an example of an alternative outdoor bathroom system 200 in an assembled configuration. FIG. 4 illustrates a perspective back view of the outdoor bathroom system 200 in an assembled configuration. FIG. 5 illustrates a perspective front view of the outdoor bathroom system 200 in a partially disassembled configuration. FIG. 6 illustrates a perspective front view of the outdoor bathroom system 200 in a disassembled configuration.

As shown in FIGS. 3-6, the outdoor bathroom system 200 is substantially similar to the outdoor bathroom system 100 except that outdoor bathroom system 200 is configured to be more compact and easier to carry than the outdoor bathroom system 100 and outdoor bathroom system 200 does not include the case 110 or the hand sanitizer 108. Specifically, in the illustrated embodiment, the outdoor bathroom system 200 includes the shovel 102, at least one tablet 104, and at least one wipe 106. Additionally, the outdoor bathroom system 200 further include a variety of additional components configured to contain the shovel 102, at least one tablet 104, and at least one wipe 106 in an easy to carry, compact configuration.

Specifically, the outdoor bathroom system 200 further includes a first cap 202, a string 204, and a second cap system 206. The first cap 202 is sized and shaped to fit into a first end 208 of the shovel 102. The first end 208 of the shovel 102 is opposite a second end 210 of the shovel 102 that includes the angled end 138 and the head 140 of the shovel 102. The second cap system 206 is sized and shaped to fit into the second end 210 of the shovel 102. Additionally, the second cap system 206 includes a hook 212 that extends at least partially over the second end 210 of the shovel 102. The string 204 is strung through the first cap 202 and hooked onto the hook 212 to maintain the first cap 202 within the first end 208 of the shovel 102, the second cap system 206 within the second end 210 of the shovel 102, and maintain the outdoor bathroom system 200 in an easy to carry, compact configuration.

The second cap system 206 includes an inner component 214 and an outer component 216. The inner component 214 is configured to be attached to the outer component 216 and the inner component 214 and the outer component 216 are configured to slide into the second end 210 of the shovel 102. Specifically, as described above, the shovel 102 is tubular and defines a shovel cavity 218. Additionally, the outer component 216 is sized and shaped to interface with the angled end 138 and the head 140 of the shovel 102 such that the inner component 214 and the outer component 216 fit within the shovel cavity 218 and within the angled end 138 and the head 140 of the shovel 102.

The outer component 216 defines a first cavity 220 for containing the tablets 104 and/or the wipes 106. In the illustrated embodiment, the first cavity 220 is configured to contain the tablets 104. The inner component 214 is attached to the outer component 216 such that the first cavity 220 is sealed, protecting the tablets 104 from the environment. Additionally, the inner component 214 and at least a portion of the outer component 216 are configured to seal the second end 210 of the shovel 102 such that the inner component 214, at least a portion of the outer component 216, and the shovel 102 define a second cavity 222 for containing the tablets 104 and/or the wipes 106. In the illustrated embodiment, the second cavity 222 is configured to contain the wipes 106. Additionally, the second cavity 222 is sealed to protect the wipes 106 from the environment.

In the illustrated embodiment, the inner component 214 include snap prongs 224 that are configured to extend into the first cavity 220 to snap the inner component 214 onto the outer component 216. In alternative embodiments, the inner component 214 may be attached to the outer component 216 by any attachment mechanism that enable the outdoor bathroom system 200 to operate as described herein. Additionally, the inner component 214 and the outer component 216 are sized and shaped to form a friction fit within the second end 210 of the shovel 102 and the string 204 maintains the inner component 214 and the outer component 216 within the shovel cavity 218.

Additionally, in the illustrated embodiment, the inner component 214 includes a rack 226 that extends into the second cavity 222 for holding the wipes 106 in the second cavity 222. The rack 226 includes two sides 228 and a base 230. The sides 228 extend from the base 230 and form an open top 232 such that the wipes 106 are placed in the rack 226 through the open top 232. The rack 226 enables the wipes 106 to be organized within the second cavity 222.

During operations, the user opens the outdoor bathroom system 200 by removing the string 204 and sliding the inner component 214 and the outer component 216 out of the shovel 102. The user digs a hole with the shovel 102 and prepares and expands the wipe 106. The user then deposits their waste in the hole and cleans up with the wipes 106. The user then places the wipe 106 in the hole with their waste, and places at least one of tablets 104 in the hole with their waste and the wipe 106. In the illustrated embodiment, the user places three tablets 104 in the hole with their waste and the wipe 106. In alternative embodiments, the user may place any number of tablets 104 in the hole. The user then uses the shovel 102 to bury their waste by filling the hole with the soil removed during the digging process. The tablets 104 are configured to break down human waste and the wipes 106 in an environmentally friendly manner. The user then closes the outdoor bathroom system 200 by sliding the inner component 214 and the outer component 216 into the shovel 102 applying the string 204 to the hook 212.

Figure 7:
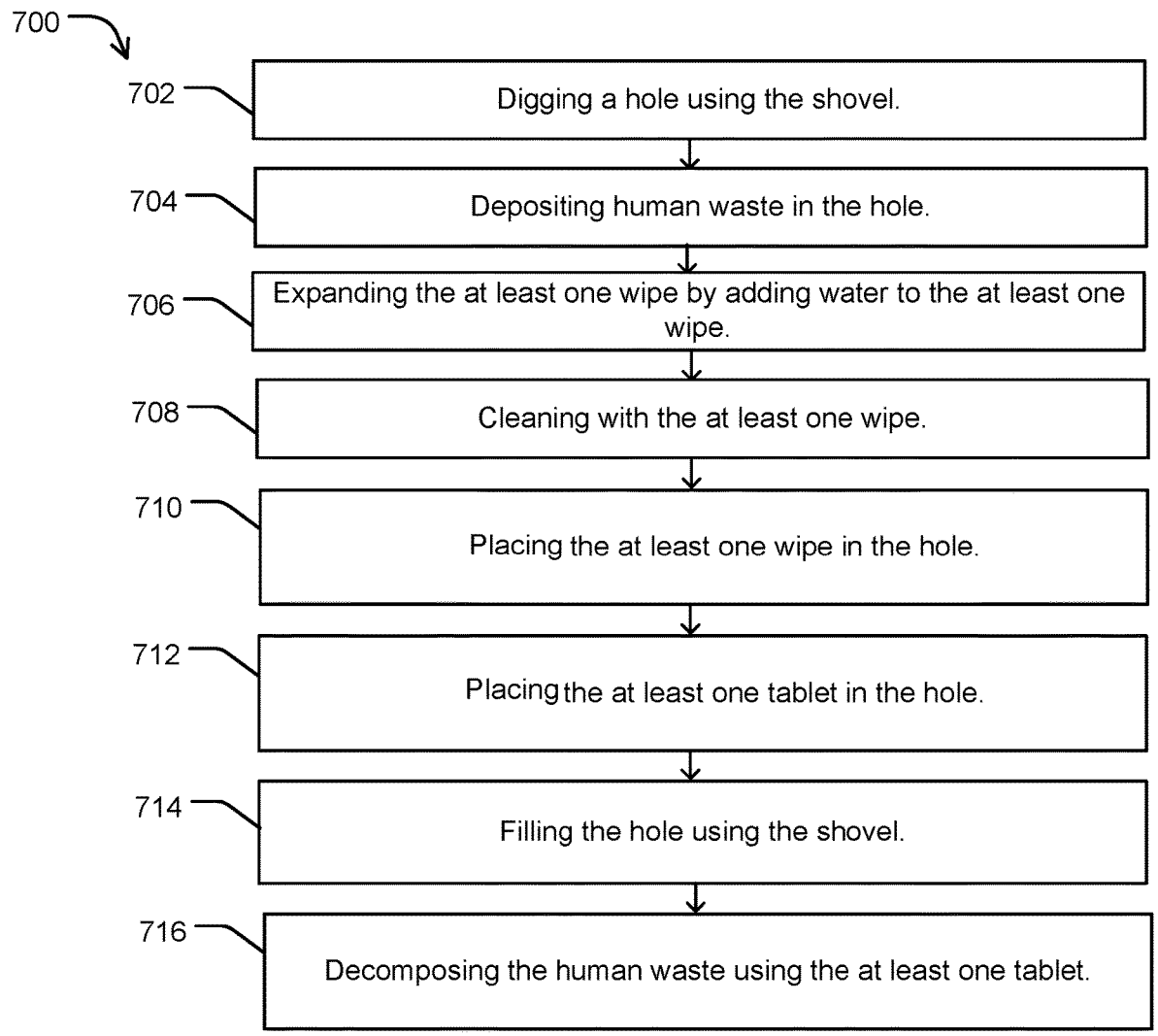
FIG. 7 illustrates an example of a flow diagram of a method of disposing of waste in accordance with aspects of the present disclosure.

FIG. 7 illustrates an example of a flow diagram of a method 700 of disposing of human waste using an outdoor bathroom system. The outdoor bathroom system includes at least one tablet configured to decompose the human waste, a shovel, and at least one wipe. The method 700 includes digging 702 a hole using the shovel. The method 700 also includes depositing 704 human waste in the hole. The method 700 further includes expanding 706 the at least one wipe by adding water to the at least one wipe. The method 700 also includes cleaning 708 with the at least one wipe. The method 700 further includes placing 710 the at least one wipe in the hole. The method 700 also includes placing 712 the at least one tablet in the hole. The method 700 further includes filling 714 the hole using the shovel. The method 700 also includes decomposing 716 the human waste using the at least one tablet. The human waste, tablets, and wipes may be placed in the hole in any order. Specifically, the tablet may be placed in the hole first followed by the human waste and the wipes.

Embodiments of the present disclosure include an outdoor bathroom system for disposing of human waste in an ecologically friendly manner. The outdoor bathroom systems described herein include a tablet that is configured to break down human waste and ensures that the waste is broken down in an ecologically friendly manner. More specifically, the outdoor systems described herein include a shovel, a table, and wipes. The shovel is used to dig a hole for containing the human waste. The tablet is configured to break down human waste and the wipe is biodegradable. More specifically, the tablet includes mycelium that is configured to break down human waste up to ten times faster than nature and the wipe includes a biodegradable material that is configured to accelerate the growth of the mycelium. During operation, the user digs a hole using the shovel and deposits their waste in the hole. The user then cleans themselves with the wipe and deposits the wipe in the hole with the waste. Finally, the user deposits a tablet in the hole with the waste and the wipe. The mycelium in the tablet breaks down the waste and the wipe and accelerates the breakdown of the waste by up to ten times faster than nature. Because the tablets break down the human waste, the hole may be shallower than normal because the mycelium breaks down the human waste faster than natural processes. Furthermore, the outdoor bathroom system enables a user to dispose of waste in a variety of environments with a variety of soils/surface conditions because the mycelium breaks down the human waste faster than natural processes. For example, the outdoor bathroom system enables a user to cover their waste with rocks and/or other surface material because the mycelium breaks down the human waste faster than natural processes. Accordingly, the outdoor bathroom system described herein enables the user to dispose of their waste in an ecologically friendly manner, reducing damage to the environment, plants, and/or wildlife.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "placing", "depositing", and "disposing" with regard to the tablets and the wipes means putting the tablets and the wipes into the hole.

Any methods described in the claims or specification should not be interpreted to require the steps to be performed in a specific order unless stated otherwise. Also, the methods should be interpreted to provide support to perform the recited steps in any order unless stated otherwise. Furthermore, the methods described herein may include additional steps not specifically mentioned herein.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An outdoor bathroom system for disposing of human waste, the outdoor bathroom system comprising:
   a shovel for digging a hole, wherein the shovel defines a shovel cavity;
   at least one wipe, wherein the human waste and the at least one wipe are disposed of in the hole and break down in the hole, and wherein the at least one wipe is at least partially contained within the shovel cavity; and
   a first cap inserted into a first end of the shovel and a second cap system inserted into a second end of the shovel.

2. The outdoor bathroom system of claim 1, further comprising at least one mycelium tablet for breaking down the human waste.

3. The outdoor bathroom system of claim 2, wherein the at least one mycelium tablet comprises *Stropharia rugosoannulata*.

4. The outdoor bathroom system of claim 2, wherein the at least one mycelium tablet comprises at least one wooden plug inoculated with mycelium.

5. The outdoor bathroom system of claim 1, wherein the at least one wipe comprises at least one compressed wipe configured to expand when water is added to the at least one compressed wipe.

6. The outdoor bathroom system of claim 1, wherein the second cap system includes an inner component and an outer component, and wherein the outer component is configured to contain the at least one tablet and the inner component is configured to contain the at least one wipe.

7. The outdoor bathroom system of claim 6, wherein the outer component defines a first cavity configured to contain the at least one tablet and the shovel cavity and the inner component defines a second cavity configured to contain the at least one wipe.

8. A method for disposing of human waste using an outdoor bathroom system, the outdoor bathroom system comprising at least one tablet configured to decompose the human waste, a shovel, and at least one wipe, the method comprising:
   digging a hole using the shovel;
   depositing human waste in the hole;
   cleaning with the at least one wipe;
   placing the at least one wipe in the hole;
   placing the at least one tablet in the hole, wherein the at least one tablet comprises at least one mycelium tablet, and wherein the at least one mycelium tablet comprises *Stropharia rugosoannulata*;
   filling the hole using the shovel; and
   decomposing the human waste using the at least one tablet, wherein decomposing the human waste using the at least one tablet comprises breaking down the human waste with the at least one mycelium tablet.

9. The method of claim 8, further comprising expanding the at least one wipe by adding water to the at least one wipe.

10. The method of claim 8, further comprising breaking down the at least one wipe with the at least one mycelium tablet.

11. An outdoor bathroom system for disposing of human waste, the outdoor bathroom system comprising:
    a shovel for digging a hole, wherein the shovel defines a shovel cavity;
    at least one wipe or toilet paper stored in the shovel cavity, wherein the human waste and the at least one wipe or toilet paper are disposed of in the hole and break down in the hole; and
    at least one mycelium tablet for breaking down the human waste, wherein the at least one mycelium tablet comprises *Stropharia rugosoannulata*.

12. The outdoor bathroom system of claim 11, wherein the at least one wipe or toilet paper comprises at least one compressed wipe configured to expand when water is added to the at least one compressed wipe.

13. The outdoor bathroom system of claim 11, further comprising a first cap positioned on a first end of the shovel and a second cap system positioned on a second end of the shovel.

14. The outdoor bathroom system of claim 13, wherein the second cap system includes an inner component configured to contain the at least one wipe.

15. The outdoor bathroom system of claim 13, further comprising a string strung through the first cap.

16. The outdoor bathroom system of claim 13, wherein the second end comprises a head defining an angled end.

17. The outdoor bathroom system of claim 16, wherein the angled end comprises a serrated edge.

* * * * *

UNITED STATES PATENT AND TRADEMARK OFFICE
CERTIFICATE OF CORRECTION

| | | |
|---|---|---|
| PATENT NO. | : 12,150,603 B2 | Page 1 of 1 |
| APPLICATION NO. | : 17/858884 | |
| DATED | : November 26, 2024 | |
| INVENTOR(S) | : Noah Schum et al. | |

It is certified that error appears in the above-identified patent and that said Letters Patent is hereby corrected as shown below:

On the Title Page

Please change item (71) the applicant and item (73) assignee name from 'PACT Outdoors LLC' to 'PACT Outdoors, Inc.'

Signed and Sealed this
Thirty-first Day of December, 2024

Derrick Brent
*Acting Director of the United States Patent and Trademark Office*